United States Patent
Kim et al.

(10) Patent No.: US 9,288,607 B2
(45) Date of Patent: Mar. 15, 2016

(54) METHOD OF SHARING A SERVICE PROVIDED TO A NEIGHBORING USER EQUIPMENT IN A WIRELESS COMMUNICATION SYSTEM AND APPARATUS THEREFOR

(71) Applicant: LG ELECTRONICS INC., Seoul (KR)

(72) Inventors: Dongcheol Kim, Anyang-si (KR); Jiwoong Jang, Anyang-si (KR); Hangyu Cho, Anyang-si (KR); Jiwon Kang, Anyang-si (KR); Sungho Park, Anyang-si (KR); Dongguk Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 13/917,220

(22) Filed: Jun. 13, 2013

(65) Prior Publication Data

US 2013/0336212 A1 Dec. 19, 2013

Related U.S. Application Data

(60) Provisional application No. 61/659,439, filed on Jun. 14, 2012.

(51) Int. Cl.
*H04W 4/00* (2009.01)
*H04W 12/08* (2009.01)
*H04W 12/06* (2009.01)

(52) U.S. Cl.
CPC .............. *H04W 4/003* (2013.01); *H04W 4/008* (2013.01); *H04W 12/06* (2013.01); *H04W 12/08* (2013.01)

(58) Field of Classification Search
None
See application file for complete search history.

(56) References Cited

U.S. PATENT DOCUMENTS

| 2004/0002305 A1* | 1/2004 | Byman-Kivivuori et al. ............................ 455/41.2 |
| 2004/0186768 A1* | 9/2004 | Wakim et al. ................... 705/14 |

* cited by examiner

*Primary Examiner* — Khoa Huynh
(74) *Attorney, Agent, or Firm* — Birch, Stewart, Kolasch & Birch, LLP

(57) ABSTRACT

A method of sharing a service provided to a neighboring user equipment, which is shared by a user equipment in a wireless communication system, includes the steps of obtaining at least one URL (uniform resource locator) information corresponding to an IP (internet protocol)-based service provided by a first communication network by the neighboring user equipment, executing an application corresponding to the obtained URL information and making a request for the IP-based service to the first communication network, receiving the requested IP-based service from the first communication network, and controlling the application to execute the received IP-based service.

6 Claims, 3 Drawing Sheets

METHOD OF SHARING A SERVICE PROVIDED TO A NEIGHBORING USER EQUIPMENT IN A WIRELESS COMMUNICATION SYSTEM AND APPARATUS THEREFOR

Pursuant to 35 U.S.C. §119(e), this application claims the benefit of priority to Provisional Application No. 61/659,439, filed on Jun. 14, 2012, the contents of which are all hereby incorporated by reference herein in their entirety.

BACKGROUND OF THE INVENTION

1. Field of the Invention

The present invention relates to a wireless communication system, and more particularly, to a method of sharing a service provided to neighboring user equipment in a wireless communication system and an apparatus therefore.

2. Discussion of the Related Art

Generally, a communication between user equipments in a short range communication is defined by a peer-to-peer form. These communication agents perform a communication with each other in a manner that a random access scheme is defined and regulated between the communication agents. It is not necessary to consider that either of the communication agents is actually connected to a public internet network. On the other hand, a communication in a cellular network should be defined as a communication between a base station and a user equipment or a communication between existence equivalent to the base station and the user equipment. And, all actions related to the communication are controlled by the base station or the existence equivalent to the base station. Under this regulation, the cellular network has a structure capable of obtaining maximum throughput in a manner of restricting the action of all user equipments based on a constant rule.

On the other hand, an over-ruled aspect may exist in the regulation according to a channel environment of a user equipment and the like. For instance, since a base station determines the power to be consumed by a user equipment for transmitting a same data traffic and the base station controls all behaviors of the user equipment necessary for transmitting the same data traffic, even a short range communication should be operated in a manner that a base station is positioned in the middle.

SUMMARY OF THE INVENTION

Accordingly, the present invention is directed to an apparatus and method thereof that substantially obviate one or more problems due to limitations and disadvantages of the related art.

A technical task that the present invention intends to achieve is to provide a method of sharing a service provided to a neighboring user equipment in a wireless communication system according to the present invention.

Another technical task that the present invention intends to achieve is to provide a user equipment to share a service provided to a neighboring user equipment in a wireless communication system according to the present invention.

Technical tasks obtainable from the present invention are non-limited the above mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the aforementioned technical task and in accordance with the purpose of the invention, as embodied and broadly described herein, according to the present invention a method of sharing a service provided to a neighboring user equipment, which is shared by a user equipment in a wireless communication system, includes the steps of obtaining at least one URL (uniform resource locator) information corresponding to an IP (internet protocol)-based service provided by a $1^{st}$ communication network by the neighboring user equipment, executing an application corresponding to the obtained URL information and making a request for the IP-based service to the $1^{st}$ communication network, receiving the requested IP-based service from the $1^{st}$ communication network, and controlling the application to execute the received IP-based service. The at least one URL information can be obtained via an RFID (radio frequency identification) tag of the neighboring user equipment. Or, the at least one URL information can be obtained using the neighboring user equipment and a $2^{nd}$ communication network. The at least one URL information obtaining step using the $2^{nd}$ communication network further include the step of establishing a connection to the neighboring user equipment in a manner that the user equipment discovers the neighboring user equipment among user equipments situated near the user equipment. The $1^{st}$ communication network includes a cellular network and the $2^{nd}$ communication network includes a local area communication network. In this case, the $2^{nd}$ communication network may correspond to a network using WiFi, Bluetooth, or Zigbee communication scheme. If the service corresponds to the service to which a password is configured for the obtained URL information, a password information on the URL information is obtained together with the URL information.

To further achieve the aforementioned different technical task and in accordance with the purpose of the invention, as embodied and broadly described herein, according to the present invention a user equipment, which is aimed for sharing a service provided to a neighboring user equipment in a wireless communication system, includes a receiver and a processor, the processor configured to control the neighboring user equipment to obtain at least one URL (uniform resource locator) information corresponding to an IP (internet protocol)-based service provided by a $1^{st}$ communication network, the processor configured to execute an application corresponding to the obtained URL information and configured to make a request for the IP-based service to the $1^{st}$ communication network, the processor configured to control the receiver to receive the requested IP-based service from the $1^{st}$ communication network, the processor configured to control the application to execute the received IP-based service. The processor is configured to obtain the at least one URL information via an RFID (radio frequency identification) tag of the neighboring user equipment. Or, the processor is configured to obtain the at least one URL information using the neighboring user equipment and a $2^{nd}$ communication network. If the at least one URL information is obtained using the $2^{nd}$ communication network, the processor is configured to establish a connection to the neighboring user equipment in a manner that the user equipment discovers the neighboring user equipment among user equipments situated near the user equipment. If the service corresponds to the service to which a password is configured for the obtained URL information, the processor is configured to obtain a password information on the URL information together with the URL information.

It is to be understood that both the foregoing general description and the following detailed description of the present invention are exemplary and explanatory and are intended to provide further explanation of the invention as claimed.

Advantageous Effects

According to various embodiments of the present invention, it becomes easy to share an identical service between UEs, thereby efficiently providing the identical service to more than 2 UEs simultaneously.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile terminal, a mobile station (MS), an advanced mobile station (AMS), and the like. And, assume that a base station is a common name of such a random node of a network stage communicating with a terminal as a Node B, an eNode B, a base station (BS), an access point (AP) and the like.

Figure 1:
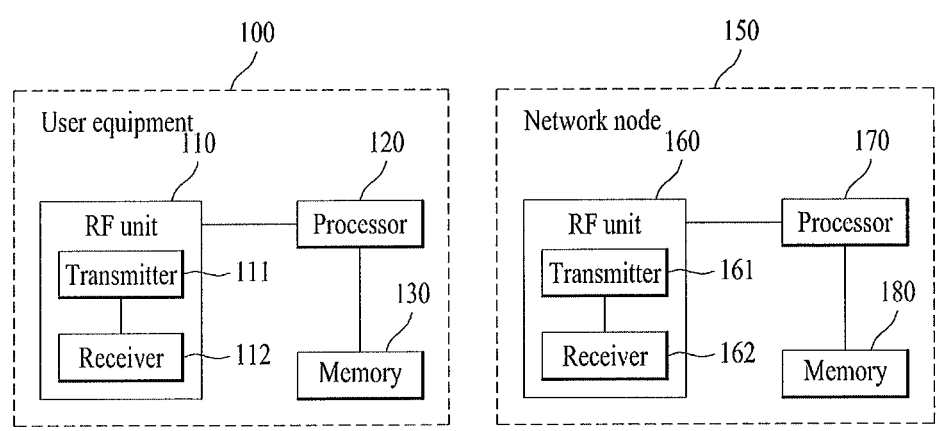
FIG. 1 is a schematic diagram of a user equipment and a network node device configuration according to embodiment of the present invention.

FIG. 1 is a schematic diagram of a user equipment and a network node device configuration according to embodiment of the present invention.

Referring to FIG. 1, a user equipment 100 and a network node 150 (as one example, a base station) may be able to include an RF unit 110/160, a processor 120/170, and a memory 130/180 (optional), respectively. And, each of the RF units 110/160 may be able to include a transmitter 111/161 and a receiver 112/162, respectively. In case of the user equipment 100, the transmitter 111 and the receiver 112 are configured to transceive a signal with the network node and different user equipments and the processor 120 is configured to control a process of transceiving a signal, which is transceived with different devices by the transmitter 111 and the receiver 112, in a manner of being functionally connected to the transmitter 111 and the receiver 112. And, after performing various processing for a signal to be transmitted, the processor 120 transmits the signal to the transmitter 111 and the receiver 112 may be able to perform a processing for the received signal. If necessary, the processor 120 is able to control to store the information included in an exchanged message in the memory 130. With the aforementioned structure, the user equipment 100 may be able to perform various embodiments explained in the following description.

Although it is not depicted in FIG. 1, the user equipment 100 may be able to include various additional configurations according to the type of the user equipment. For instance, if the corresponding user equipment 100 is designed for an intelligent measuring purpose, the corresponding user equipment 100 may be able to include an additional configuration for power measurement and the like. A power measurement operation can be controlled by the processor 120 depicted in FIG. 1 or can be controlled by a processor (not depicted), which is separately configured. Although FIG. 1 shows a case that a communication is established between the user equipment 100 and the network node 150, each of the network nodes may be able to perform a method according to the various embodiments described in the following description with the form identical to the device configuration depicted in FIG. 1.

Meanwhile, the transmitter 161 and the receiver 162 of the network node are configured to transceive a signal with different network nodes and the processor 170 is configured to control a process of transceiving a signal, which is transceived with different devices by the transmitter 161 and the receiver 162, in a manner of being functionally connected to the transmitter 161 and the receiver 162. And, after performing various processing for a signal to be transmitted, the processor 170 transmits the signal to the transmitter 161 and the receiver 162 may be able to perform a processing for the received signal. If necessary, the processor 170 is able to control to store the information included in an exchanged message in the memory 230. With the aforementioned structure, the network node may be able to perform various embodiments explained in the following description.

The processor 120/170 of the user equipment/network node 100/150 directs operations (e.g., control, adjustment, management, etc.) of the user equipment/network node. The processor 120/170 may be connected to the memory 130/180 configured to store program codes and data. The memory 130/180 is connected to the processor 120/170 to store operating systems, applications and general files.

The processor 120/170 may be called one of a controller, a microcontroller, a microprocessor, a microcomputer and the like. And, the processor 120/170 may be implemented using hardware, firmware, software and/or any combinations thereof. In case of implementing the embodiment of the present invention by hardware, the processor 120/170 may be provided with one of ASICs (application specific integrated circuits), DSPs (digital signal processors), DSPDs (digital signal processing devices), PLDs (programmable logic devices), FPGAs (field programmable gate arrays), and the like, which is configured to perform the present invention.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 120/170 or stored in the memory 130/180 to be driven by the processor 120/170.

In the present specification, assume that the processor 120/170 processes functions except the function of which the user equipment 100 and the network node 150 receive/transmit a signal from/to different nodes and the function of storing unless there is a specific comment.

The present invention proposes a method of sharing a service of a multiple network supportive of user equipment (UE) in a manner of using a cellular network communication-based local area network (e.g., WiFi, Bluetooth, Zigbee and the like). The present invention is described according to a method of sharing a service between a $2^{nd}$ communication network supportive of user equipments based on a $1^{st}$ communication network (the $1^{st}$ and the $2^{nd}$ communication network correspond to a heterogeneous network from each other). The present invention is described based on a premise that both a UE A 210 and a UE B 220 are able to support the communication via the $1^{st}$ and the $2^{nd}$ communication network.

Figure 2:
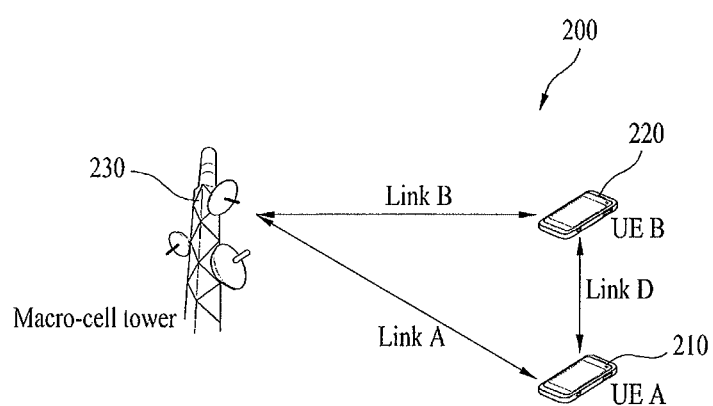
FIG. 2 is a diagram of a network structure 200 to explain a method of sharing a service between user equipments according to the present invention.

FIG. 2 is a diagram of a network structure 200 to explain a method of sharing a service between user equipments according to the present invention.

Referring to FIG. 2, two types of communication mode are available between the UE A and the UE B. A UE may be able to select either a cooperative communication mode or a simultaneous sharing mode. The cooperative communication mode works as a role of helping for a last UE to receive a data in a manner that a cooperative UE (UE 1) except the last UE (UE 2) receives the data instead. One UE may become a cooperative UE on a prescribed timing point or may change its role to the role of a last UE. According to the simultaneous sharing mode, a UE performing a cooperative communication may be able to share a same service with a different UE. In the following description, supporting the simultaneous sharing mode is explained with an example.

As shown in FIG. 2, a network structure 200 includes a control tower 230 controlling a macro-cell, a UE A 210, and a UE B 220. A link A is established between the UE A 210 and the base station and a signal is exchanged via a $1^{st}$ communication network (e.g., a cellular network). And, a link B is established between the UE B 220 and the base station and a signal is exchange via the $1^{st}$ communication network. Meanwhile, a signal can be exchanged between the UE A 210 and the UE B 220 via a $2^{nd}$ communication network (e.g., a local area network), which is different from the $1^{st}$ communication network. In the following description, although the $1^{st}$ and the $2^{nd}$ communication network are described as heterogeneous with each other, it may not exclude a case that the $1^{st}$ and the $2^{nd}$ communication network are identical to each other. The cellular-based communication method (e.g., WiFi, Bluetooth, Zigbee, RFID, and the like) may be able to simultaneously support a UE with the $1^{st}$ and the $2^{nd}$ communication network by a frequency assignment policy, a different method, or the like.

Detail processes for a method of sharing a service accomplished between the UE A 210 and the UE B 220 using the network structure 200 depicted in FIG. 2 is explained with reference to FIG. 3.

Figure 3:
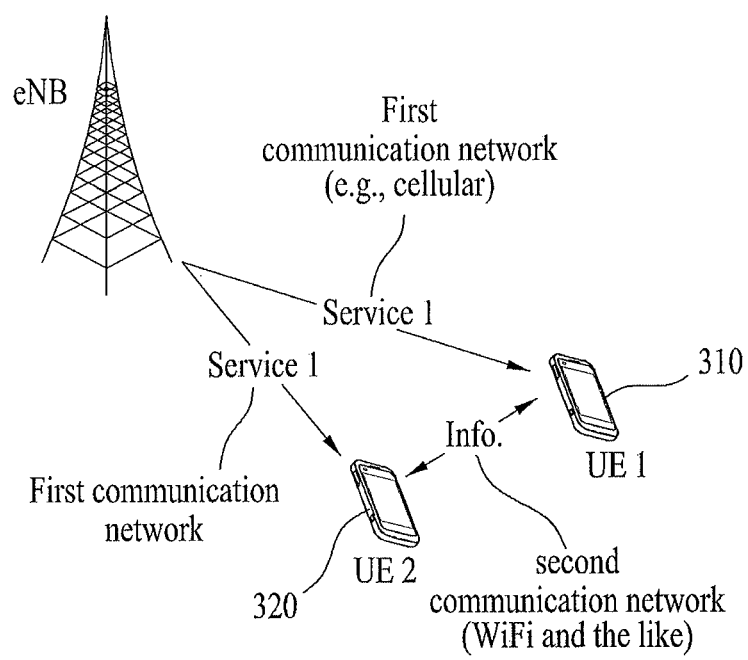
FIG. 3 is an exemplary diagram to explain a method of sharing a service between user equipments according to the present invention.

FIG. 3 is an exemplary diagram to explain a method of sharing a service between user equipments according to the present invention.

Referring to FIG. 3, a UE 1 310 corresponds to a UE currently using a specific service (IP-based service (e.g., WWW, P2P, FTP, Real/Non-real streaming service)) (represented in FIG. 3 as 'service 1') and a UE 2 corresponds to a UE making a request for sharing the specific service.

In case that the UE 1 310 is currently executing the IP-based service (e.g., WWW, P2P, FTP, Real/Non-real streaming service) and the UE 1 intends to share the corresponding service with a different UE (i.e., the UE 2 320), a following process is necessary.

By enabling the UE 2 320 supporting a $2^{nd}$ communication network to share URL (uniform resource locator) information of the UE 1 310, which is currently using a service via a $1^{st}$ communication network (e.g., a cellular network), via the $2^{st}$ communication network (e.g., WiFi, Bluetooth, Zigbee, RFID), the UE 2 320 may be able to use the service, which is currently used by the UE 1 310. In this case, the URL may be able to indicate all of the resources on a computer network as well as a website address. In order for the UE 2 320 to access the address, the UE 2 should know a protocol corresponding to the URL and should access the address with the protocol identical to the URL. In case of a file transfer protocol (FTP), the UE 2 should use a FTP client. In case of a HTTP, the UE 2 should use a web browser. In case of a telnet, the UE 2 should access using a telnet program.

The URL information of the service currently used by the UE 1 310 can be shared by the UE 2 320 via the $2^{nd}$ communication network. Or, IP/PW (password) for a corresponding URL can be shared by the UE 2 together with the URL information. Or, identification information (user name/information capable of recognizing a user, e.g., terminal name and the like) of a UE, which makes a corresponding URL to be shared, can be shared together with the URL information.

A method of sharing a service URL information can be divided into a method of sharing a corresponding service URL information via NFC/RFID tag and a method of sharing the corresponding service URL information via WiFi/Bluetooth/Zigbee.

Embodiment 1

Method of Sharing Corresponding Service URL Information via NFC/RFID Tag

The embodiment 1 according to the present invention corresponds to a method of sharing corresponding service URL information via a near field communication (NFC)/radio frequency identification (RFID) tag. In particular, it is a method of sharing URL information in a manner that the UE 2 320 receives a URL tagging the UE 1 310 by a NFC/RFID tag. If the UE 2 320 performs a NFC/RFID tag with the UE 1 310 and a corresponding service URL information is shared, the processor of the UE 2 320 controls a corresponding URL-based application to operate in a manner of being triggered. The application of the UE 2 320 makes a request for a corresponding URL to the $1^{st}$ communication network (e.g., a cellular network) and may be able to receive a data for a corresponding service from the $1^{st}$ communication network.

Embodiment 2

Method of Sharing Corresponding Service URL Information Using Local Area Network (e.g., WiFi/Bluetooth/Zigbee)

The embodiment 2 according to the present invention corresponds to a method of sharing corresponding service URL information using WiFi/Bluetooth/Zigbee. In case of the method of sharing a corresponding URL information using WiFi/Bluetooth/Zigbee, first of all, a discovery process is performed between the UEs (the UE 1 310 and the UE 2 320). After the discovery, a connection is established between the UEs and it may be then able to share the corresponding service URL information.

The processor of the UE 2 320 control an application to obtain the URL information of a corresponding service, which is received by the UE 1 310 via a base station, using the WiFi/Bluetooth/Zigbee communication scheme. Thereafter, the processor of the UE 2 may be able to control the corresponding service to be received and executed together with the UE 1 in a manner of sharing the corresponding service with the UE 1 310, which is currently executing an identical application.

If the UE 1 310 is executing a plurality of URLs, the processor of the UE 2 320 may be able to control the application to display a URL list in a display unit in order for a user to select the URL list. Thereafter, one or a plurality of the URLs can be shared by the UEs (the UE 1 310 and the UE 2 320) according to the selection of the user.

As mentioned in the foregoing description, when a URL information sharing of a corresponding service is ended, the UE 2 320 makes a request for the corresponding service to a base station of the 1$^{st}$ communication network (e.g., a cellular network), which provides the service, using a corresponding URL information and may be able to receive the corresponding service from the base station via the 1$^{st}$ communication network. If the URL information is received or obtained from the UE 1 310, the processor of the UE 2 320 may be able to control an identical application to automatically execute the corresponding URL or may be able to control a user to execute the corresponding URL.

Thereafter, the processor of the UE 2 320 controls the application to make a request for the corresponding URL to the 1$^{st}$ communication network and the UE 2 320 performs a process of receiving a data, which corresponds to the corresponding URL, from the 1$^{st}$ communication network.

According to the aforementioned embodiment of the present invention, sharing of an identical service between UEs becomes easier, thereby providing the identical service to more than 2 UEs simultaneously.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of sharing a service provided to a neighboring user equipment, by a user equipment in a wireless communication system, the method comprising:
   obtaining at least one URL (uniform resource locator) information and identification information of the neighboring user equipment from the neighboring user equipment through a second communication network, wherein the at least one URL information corresponds to an IP (internet protocol)-based service provided to the neighboring user equipment through a first communication network;
   executing an application corresponding to the obtained URL information and requesting for the IP-based service to the first communication network with the obtained identification information;
   receiving the requested IP-based service from the first communication network with the obtained identification information; and
   controlling the application to execute the received IP-based service,
   wherein the first communication network includes a cellular network,
   wherein the second communication network includes a local area network using a WiFi, Bluetooth, or Zigbee communication scheme, and
   wherein the neighboring user equipment is capable of receiving data through the first communication network for the user equipment.

2. The method of claim 1, the obtaining of the at least one URL information further comprising establishing a connection to the neighboring user equipment in a manner that the user equipment discovers the neighboring user equipment among user equipments situated near the user equipment.

3. The method of claim 1, wherein if the service corresponds to the service to which a password is configured for the obtained URL information, password information on the URL information is obtained together with the URL information.

4. A user equipment for sharing a service provided to a neighboring user equipment in a wireless communication system, the user equipment comprising:
   a radio frequency (RF) unit including a receiver and a transmitter, wherein the RF unit is configured to transceive signals; and
   a processor configured to control the RF unit,
   wherein the processor is further configured to:
      obtain at least one URL (uniform resource locator) information and identification information of the neighboring user equipment from the neighboring user equipment through a second communication network, wherein the at least one URL information corresponds to an IP (internet protocol)-based service provided to the neighboring user equipment through a first communication network,
      execute an application corresponding to the obtained URL information and request for the IP-based service to the first communication network with the obtained identification information,
      receive the requested IP-based service from the first communication network, and
      control the application to execute the received IP-based service, wherein the first communication network includes a cellular network,
wherein the second communication network includes a local area network using a WiFi, Bluetooth, or Zigbee communication scheme, and
wherein the neighboring user equipment is capable of receiving data through the first communication network for the user equipment.

5. The user equipment of claim 4, wherein the processor is further configured to establish a connection to the neighboring user equipment in a manner that the user equipment discovers the neighboring user equipment among user equipments situated near the user equipment.

6. The user equipment of claim 4, wherein if the service corresponds to the service to which a password is configured for the obtained URL information, the processor is further configured to obtain password information on the URL information together with the URL information.

* * * * *